(No Model.) 2 Sheets—Sheet 1.
S. T. RUSSELL.
HAY LOADER.
No. 546,681. Patented Sept. 24, 1895.
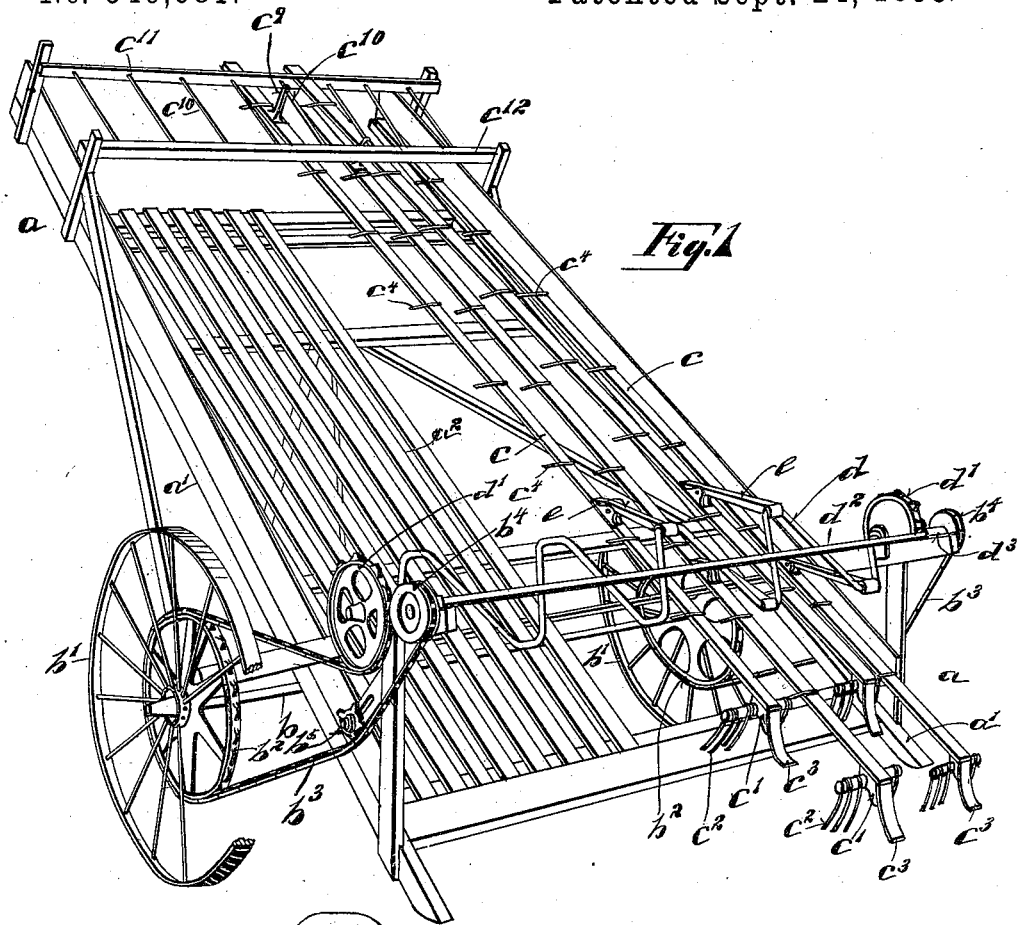
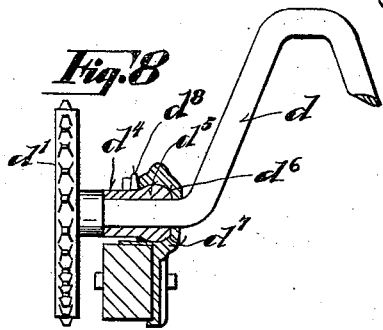
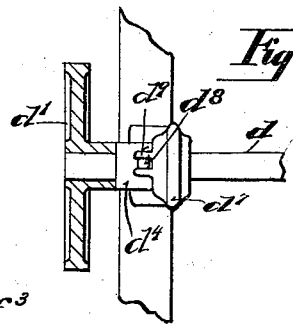
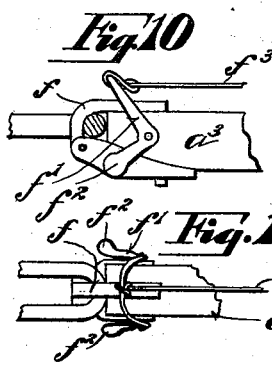
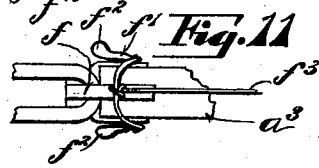
WITNESSES:
Fred Ernest
Chas. J. Welch
INVENTOR
Samuel T. Russell
BY
ATTORNEYS

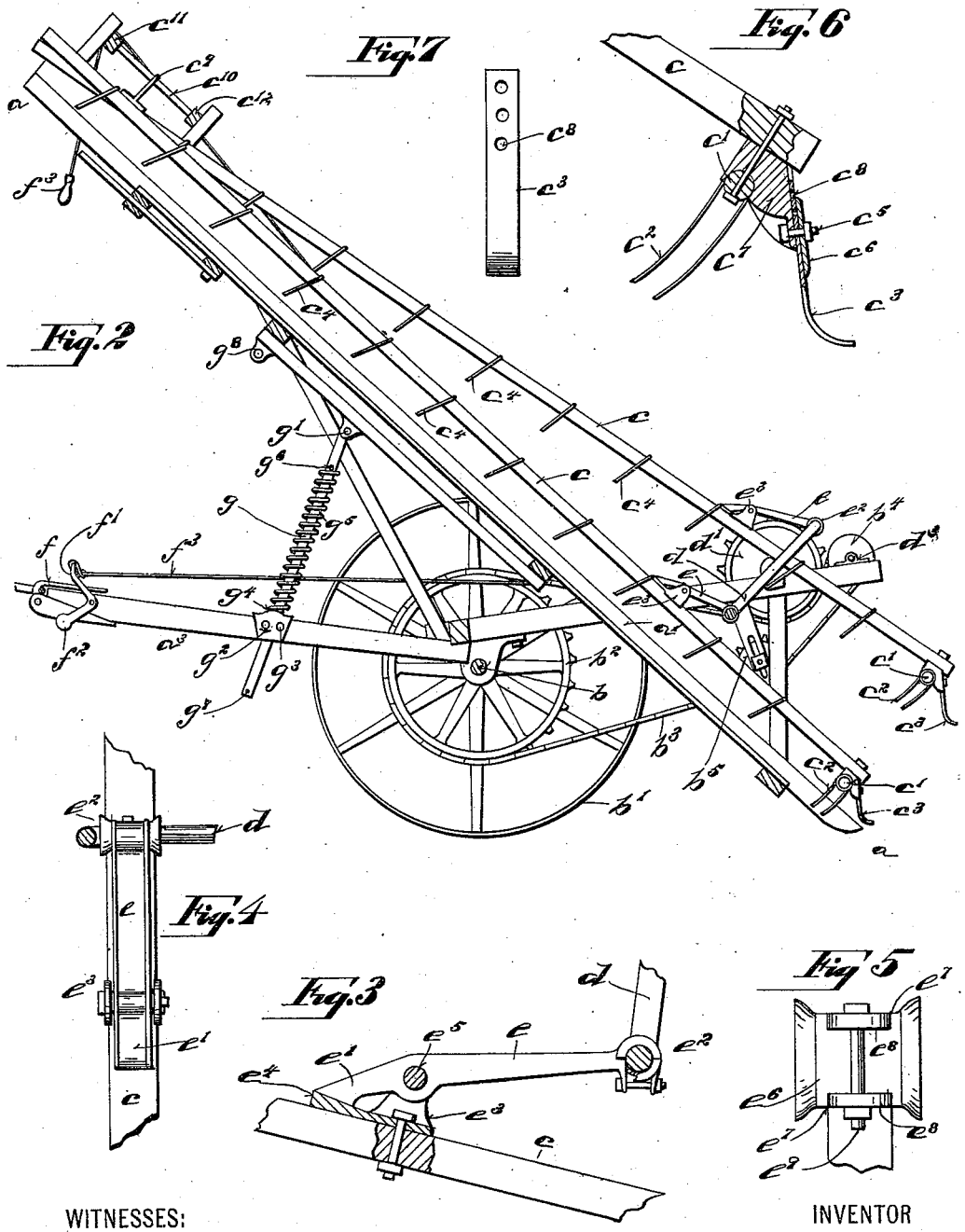

UNITED STATES PATENT OFFICE.

SAMUEL T. RUSSELL, OF SPRINGFIELD, OHIO.

HAY-LOADER.

SPECIFICATION forming part of Letters Patent No. 546,681, dated September 24, 1895.

Application filed May 28, 1894. Serial No. 512,660. (No model.)

*To all whom it may concern:*

Be it known that I, SAMUEL T. RUSSELL, a citizen of the United States, residing at Springfield, in the county of Clark and State of Ohio, have invented certain new and useful Improvements in Hay-Loaders, of which the following is a specification.

My invention relates to improvements in hay-loaders, and it especially relates to that class of loaders which are adapted to be hinged to the rear of a wagon and elevate the hay by means of reciprocating rakes operating in connection with an inclined bed.

The object of my invention is to simplify the construction of hay-loaders of this kind and increase the efficiency of operation of the device and at the same time decrease the cost of production. I attain these objects by the constructions shown in the accompanying drawings, in which—

Figure 1 is a perspective view of a device embodying my invention with some of the parts broken away for perspicacity. Fig. 2 is a sectional elevation of the same. Figs. 3, 4, and 5 are detail views showing the manner of connecting the reciprocating rakes to the crank-shaft. Figs. 6 and 7 are detail views of my rake-head and support. Figs. 8 and 9 are detail views of the crank-shaft bearings and supports. Figs. 10 and 11 are details of a hitching device for connecting the loader to the wagon.

Like parts are represented by similar letters of reference in the several views.

In the said drawings, $a\ a$ represent the main frame, the side pieces $a'$ of which are extended at the bottom, so as to rest in close proximity to or slide upon the ground. The frame $a\ a$ is mounted on the main axle $b$, which is supported at each end by carrying-wheels $b'$, to each of which is connected a sprocket-wheel $b^2$. The main frame $a\ a$ is provided with a series of slats, which forms an inclined bed $a^2$ between the side pieces $a'$.

Arranged above the bed $a^2$ is a series of reciprocating rake-bars $c$, each of which is provided at its upper end with a loop $c^9$, adapted to fit over and be supported by a bar $c^{10}$, which bars extend between suitable supporting-pieces $c^{11}\ c^{12}$ on the main frame $a$, the construction being such as to form a sliding support for the upper end of the rake-bars, as shown. The lower ends of the rake-bars are each supported from a crank on a crank-shaft $d$, which extends across the main frame and above the inclined bed near the lower end thereof, the crank-shaft being formed with cranks extending in opposite directions throughout the length thereof from one side to the other, each alternate rake-bar $c$ being connected to a crank, which is on the opposite side of the center of revolution of said crank-shaft.

Each of the rake-bars $c$ is provided at its lower end with a rake-head $c'$, having raking-teeth $c^2$, and supported on an adjustable shoe $c^3$. The rake-bars $c$ are also further provided with teeth $c^4$ throughout their length. As the rake-bars are reciprocated by the revolution of the crank-shaft the shoes $c^3$ of the alternate rake-heads are brought into contact with the ground and the rakes moved longitudinally, so as to rake the hay thereon and carry it up the incline in a well-known manner. Now, in order to provide for giving the rake-head a longitudinal movement of considerable length parallel with the ground, and at the same time secure the motion from a single crank-shaft, I employ a peculiarly-constructed connection between the crank-shaft and the rake-bar, which, when the cranks are on their upward and backward stroke, maintains the same relative position with reference to the rake-bar, but which is adapted to yield as the crank is on its downward and forward stroke to permit the rake to remain in contact with the ground or adjust itself to the inequalities thereof or the quantity of hay gathered thereby. This is accomplished by employing a pivoted arm $e$ on each of the rake-bars $c$, with an extended foot or projection $e'$, adapted to limit the movement of said arm about its pivotal center by coming in contact with the rake-bar $c$ or a plate thereon, the opposite end of the arm $e$ being provided with a bearing $e^2$, secured to one of the cranks of the crank-shaft $d$. The rake-bar $c$ is preferably provided with a bifurcated bearing-block $e^3$, having an extended foot or plate $e^4$ and bolted or otherwise secured to the rake-bar. A pin $e^5$, extending through the extremities of the bearing-block $e^3$ and through the arm $e$ serves to pivot these parts together. The bearing $e^2$ in the opposite end of the arm $e$ is preferably formed with a removable cover $e^6$, having at each side a recessed opening $e^7$, adapted to fit over lugs or ears $e^8$ on the arm, a bolt $e^9$, extending through said ears or lugs and below said cap $e^6$, being adapted to hold the parts in their proper positions.

The shoe $c^3$ of the rake-head $c'$ consists, essentially, of a single bar, preferably of steel, and is provided at its upper end with a series of openings $c^8$, adapted to receive a bolt $c^5$, which extends through a plate or cap $c^6$ on one side of the shoe $c^3$ and through a suitable supporting-casting $c^7$, attached to the rake-bar $c$, and also adapted to support the rake-head $c'$. By placing the bolt $c^5$ through the different openings $c^8$ the shoe $c^3$ may be adjusted so as to raise or lower the rake-head to the proper position determined by the character of the ground.

The power to drive the crank-shaft is secured directly from the respective sprocket-wheels $b^2$ by chains $b^3$, which extend partly around sprocket-wheels $d'$ on the crank-shaft $d$, thence over a supporting-pulley $b^4$, arranged adjacent to said sprocket-wheel $d'$. It will be seen that by this construction the chain makes only a partial turn around the sprocket-wheel $d'$, thence over the pulley $b^4$, and back to the sprocket-wheel $b^2$, a small adjustable sprocket-wheel $b^5$ being employed as a tightener to take up the slack chain. The pulleys $b^4$ are each journaled on the ends of a stationary rod $d^2$, which extends across the main frame in proximity to the crank-shaft and is held in stationary bearings $d^3$ at each end, and thus stiffens the frame at this point and at the same time forms journals, on which the pulleys $b^4$ turn.

It will be seen that the weight of the lower ends of the rake-bars comes entirely on the crank-shaft, and it is practically impossible to form a crank-shaft of sufficient rigidity so that no spring will occur in the length thereof.

To provide means to compensate for any springing or sagging of the crank-shaft, I employ adjustable bearings for said crank-shaft, which consist, essentially, of a sleeve $d^4$, having at one end an enlarged convex bearing portion $d^5$, adapted to fit in a similarly-shaped concave portion $d^6$ in a bearing-support $d^7$. The bearing-support $d^7$ is rigidly connected to the frame, the sleeve $d^4$ being held from revolving in the concave portion $d^6$ by means of a lug or projection $d^8$ on the sleeve $d^4$, which fits between suitable lugs or projections $d^9$ on the bearing-support $d^7$, the construction being such that the bearing adjusts itself to any position which the crank-shaft may assume in operation, the arrangement of the driving-chain on the sprocket-wheel being such as will readily permit any variation in the parts caused by the sagging or springing of the crank-shaft. The arrangement of the driving-chain described also secures the proper movement of the crank-shaft with reference to the driving-wheels without the use of intermediate gears or crossing the belt or chain.

To provide a simple means for hitching and unhitching the loader to the wagon or other point of attachment, I employ a curved hook-shaped piece $f$, arranged on a forwardly-projecting tongue or hitching-beam $a^3$ and adapted to hook in a suitable eye of the wagon or other device to which it is hitched. This pivoted hook-shaped piece $f$ in its normal position is retained by a hinged loop $f'$, having weighted projections $f^2$, adapted to hold it in this position. A rope $f^3$, leading from the swinging loop $f'$, extends to the top of the loader in convenient reach of the operator, so that when the load is complete by pulling on said rope the loop will be removed from the hook and allow the hook to turn on its pivotal center and thus detach the loader from the wagon.

In operation the main frame or bed is supported from the tongue or hitching-beam $a^3$ by a pivoted bar $g$, attached at $g'$ to the main frame and extending downwardly through a suitable guiding-piece $g^2$ on said hitching-beam, the guiding-piece $g^2$ being provided on the inside with guiding-trunnions $g^3$, between which the bar $g$ is adapted to reciprocate, and the upper part of said guiding-piece being provided with a curved bearing portion $g^4$, in which the arm of a spring $g^5$ is adapted to rest, the other end of said spring $g^5$ resting in contact with a pin $g^6$ on the bar $g$, so that the bed of the loader is yieldingly connected to the hitching-beam, which thus sustains a portion of the load thereof.

To provide for raising the loader out of contact with the ground for transportation from place to place, I employ in the lower end of the bar $g$ a pin or shoulder $g^7$ and connect to the frame $a\ a$ of the loader a bifurcated clip $g^8$, so that by releasing the bar $g$ from the point $g'$ and attaching it to $g^8$ the frame of the loader is tilted on the axle, so as to raise the frame-piece $a'$ from contact with the ground, and thus balances the frame more nearly over the axle for transportation.

Having thus described my invention, I claim—

1. In a hay loader, a series of rake bars in combination with an inclined bed, a sliding support for said bars at one end, and a crank shaft connected to said bars at the opposite end, connecting arms between said crank shaft and said rake bars, each of said connecting arms being pivoted to one of said rake bars and provided with an extended portion to limit the movement thereof, substantially as specified.

2. The combination with a rake bar and crank shaft, as described, of an arm hinged to said crank shaft and pivotally connected to said rake bar, said arm being provided with an extended portion or foot to contact with said rake bar and thus limit the movement thereof, substantially as specified.

3. The combination with a rake bar and a crank shaft, of a hinged arm, as described, a bearing block for said hinged arm having an extended piece, and a foot on said arm adapted to contact with said bearing block, and an open bearing in the end of said arm connected to said crank shaft, substantially as specified.

4. The combination with the crank shaft and rake bars, and a hinged arm on said crank shaft for each of said rake bars, each of said arms being pivoted to one of said rake bars and extended so as to contact with said rake bars and limit the movement thereof, bearings for said crank shaft, and a stationary rod in proximity to said crank shaft, and means as described for communicating motion to said crank shaft, substantially as specified.

5. The combination with a crank shaft and a rake bar connected thereto, a hinged arm journaled on said crank shaft and pivoted to said rake bar, said arm being extended to contact with said rake bar and limit the movement thereof, a rake head on said rake bar, a curved bar extending downwardly from said rake head to form a shoe, and means, substantially as described, for securing said shoe in different positions of adjustment to said rake head, substantially as specified.

6. The combination with a reciprocating rake bar, of a rake head connected to said rake bar, a supporting seat for said rake head, said seat being provided with an extended portion, a curved bar extending downwardly from said head to form a shoe, said bar being provided with a series of openings adapted to receive a fastening device to secure the same in different positions of adjustment, and a cap over said bar, substantially as specified.

In testimony whereof I have hereunto set my hand this 19th day of May, A. D. 1894.

SAMUEL T. RUSSELL.

Witnesses:
ROBERT C. RODGERS,
CHAS. I. WELCH.